United States Patent
Van Dalen et al.

(10) Patent No.: US 8,581,891 B2
(45) Date of Patent: Nov. 12, 2013

(54) LIGHT SENSOR NOISE SUPPRESSION ARRANGEMENT AND METHOD THEREFOR

(75) Inventors: Rob Van Dalen, Bergeijk (NL); Sergio Masferrer Oncala, Foios (ES)

(73) Assignee: NXP B.V., Eindhoven (NL)

( * ) Notice: Subject to any disclaimer, the term of this patent is extended or adjusted under 35 U.S.C. 154(b) by 511 days.

(21) Appl. No.: 12/933,816

(22) PCT Filed: Mar. 20, 2009

(86) PCT No.: PCT/IB2009/051193
§ 371 (c)(1),
(2), (4) Date: Sep. 21, 2010

(87) PCT Pub. No.: WO2009/118675
PCT Pub. Date: Oct. 1, 2009

(65) Prior Publication Data
US 2011/0025661 A1    Feb. 3, 2011

Related U.S. Application Data

(60) Provisional application No. 61/038,747, filed on Mar. 22, 2008.

(51) Int. Cl.
*G06F 3/038*    (2013.01)
*G01J 1/44*    (2006.01)

(52) U.S. Cl.
USPC ........................................ 345/207

(58) Field of Classification Search
USPC ........................................ 345/207
See application file for complete search history.

(56) References Cited

U.S. PATENT DOCUMENTS

| | | | |
|---|---|---|---|
| 4,460,836 A | * | 7/1984 | Tsunekawa et al. ........... 327/515 |
| 4,725,866 A | * | 2/1988 | Tsunekawa et al. ........... 396/234 |
| 5,239,369 A | * | 8/1993 | Suzuki ........................ 348/226.1 |
| 5,717,965 A | | 2/1998 | Iwasaki |
| 2004/0201729 A1 | | 10/2004 | Poplin et al. |
| 2005/0093996 A1 | | 5/2005 | Kinoshita |

FOREIGN PATENT DOCUMENTS

| | | |
|---|---|---|
| EP | 588438 A1 | 3/1994 |
| JP | 59 166822 A | 9/1984 |
| JP | 1081580 A | 3/1989 |
| JP | 1034070 A | 7/1989 |
| JP | 2006245784 A | 9/2006 |
| WO | 0124535 A1 | 4/2001 |

OTHER PUBLICATIONS

International Search Report and Written Opinion for Application PCT/IB2009/051193 (March 20, 2009).

* cited by examiner

*Primary Examiner* — Amare Mengistu
*Assistant Examiner* — Jennifer Zubajlo (57) ABSTRACT

A light sensor arrangement is used to detect ambient light conditions. According to an example embodiment, a light detector arrangement (e.g., 110) generates an output in response to light incident thereupon. An averaging-type circuit (e.g., 160) samples the generated output for overlapping time intervals, and combines the sampled output to form a new output that characterizes the incident light. The overlapping time intervals 5 (e.g., 221-261) are chosen such that the new output is generally flicker-free for incident light generated using one of at least two different power supply frequencies.

13 Claims, 6 Drawing Sheets

LIGHT SENSOR NOISE SUPPRESSION ARRANGEMENT AND METHOD THEREFOR

This patent document relates to electronic devices, and more particularly, to light-detection devices and the operation thereof.

Light sources such as fluorescent lamps and light-emitting diodes (LEDs) generally have response times that are much faster than the alternating current (AC) frequency of the power supplies that provide power to the lights. Generally, these AC power supplies operate at frequencies that are either 50 Hz or 60 Hz, depending upon the location. Due to these characteristics, the emitted light of such light sources often exhibits a strong modulated component, of which the dominant component, given that the light output is proportional to power rather than bias, is respectively at about 100 Hz or 120 Hz, relative to a 50 Hz or 60 Hz power supply.

The presence of such a time-varying (modulated) component in customarily-used light sources poses challenges to light sensors and imagers because measurements taken at a given time can either correspond to an operating condition of a light source that is at its maximum or minimum intensity (or between these intensities). This can introduce what is often referred to as flicker noise in devices such as imaging devices and in other light-sensing devices.

The various effects of flicker noise, when not compensated for, differ per application and implementation of a light sensor or imaging device. For instance, a simple (e.g., single pixel) light sensor will generally give incorrect and unstable readings under conditions involving flicker noise. The effect upon a more complex (e.g., multi-pixel) light sensor or imager can range from simple incorrect exposure (e.g., global shutter) to the formation of bands of pixels that alternate between bright and dark (e.g., rolling shutter). The output of a video imager will often exhibit oscillations when exposed to AC modulated light.

Approaches to addressing flicker noise have been challenging to implement. For instance, in imaging devices such as a camera, the shutter speed can be controlled by setting the speed to correspond to the flicker (e.g., $\frac{1}{100}$ s or $\frac{1}{120}$ s). However, controlling the shutter speed relative to the frequency can require additional circuitry for detecting the frequency of the flicker component (e.g., direct AC frequency measurement is not possible for hand-held equipment).

Other approaches to addressing flicker noise have involved averaging the incoming light (e.g., averaging the intensity of the light) over an integer number of oscillatory periods of the illumination source, and thus of different AC frequencies that may be encountered (e.g., 50 Hz or 60 Hz). However, the time intervals needed to suppress flicker noise for different main power supply frequencies requires a rather long integration time. This relatively long integration time can present issues to the processing of light data, to the generation of images in imaging devices and to the requirements of devices implementing noise suppression in terms of both power consumption and circuit complexity (e.g., manufacturing cost).

The nature of power supplies used to power light sources, and the corresponding light output from these sources, continues to pose a challenge to light-based devices such as sensor devices and imaging devices.

The present invention is directed to overcoming the above-mentioned challenges and others related to the types of light-sensing applications discussed above, as well as other applications. These and other aspects of the present invention are exemplified in a number of illustrated implementations and applications, some of which are shown in the figures and characterized in the claims section that follows.

Various example embodiments relate to light-sensing approaches that mitigate the effect of light source characteristics relating to AC power supplies as discussed above. In some embodiments, substantially flicker-free detection or measurement of light from light sources powered at different AC frequencies (e.g., 50 Hz or 60 Hz) is realized at a desirably high speed.

According to a more particular example embodiment of the present invention, a sensor arrangement is used to sense light from light sources that are respectively operated at different power supply frequencies. The sensor arrangement includes a light detector and an averaging circuit. The light detector generates an output in response to light incident upon the detector. The averaging circuit samples the output during each of a number of overlapping time intervals. Each interval is about equal in time to an oscillatory period of one of the power supply frequencies, and the combined time of the intervals is about equal to the combined time of an integer number of oscillatory periods of another of the power supply frequencies. The output sampled for each of the overlapping time intervals is integrated and the integrated outputs are combined to form a new output that characterizes the incident light.

Other example embodiments are directed to the use of a sensor arrangement as described above to control the display of a mobile hand-held device. The display control is effected using a substantially flicker-free output generated in response to incident light under different conditions that may involve different power sources operating at different supply frequencies.

The above summary is not intended to describe each illustrated embodiment or every implementation of the present invention. The figures and detailed description that follow more particularly exemplify these embodiments.

The invention may be more completely understood in consideration of the following detailed description of various embodiments of the invention in connection with the accompanying drawings, in which:

FIGS. 2A-2C show a sampling and averaging approach for light sensing, according to another example embodiment of the present invention, where

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including that defined by the appended claims.

The present invention is believed to be applicable to a variety of electronic circuits, devices and approaches including, for example, light-sensing devices that benefit from the suppression of flicker noise due to AC light sources. While the present invention is not necessarily limited to such applications, an appreciation of various aspects of the invention is best gained through a discussion of examples in such an environment.

According to an example embodiment of the present invention, a light sensor processing circuit facilitates the suppression of noise characteristics in detected light, as related to the AC power supply of the source(s) of the detected light. A value corresponding to sensed light is averaged (e.g., via integration), using overlapping time intervals corresponding to the periodicity of expected AC power supplies that the sensor will encounter. The averaged, or combined, value of the overlapping time intervals generates an output that is substantially free of flicker-based noise attributable to the AC power supply. The time intervals are of a length that corresponds to an oscillation of an expected AC power supply frequency, and the number of intervals are of a total time that corresponds to an integer number of oscillations of another (different) expected AC power supply frequency. The overlapping time intervals are offset from one another such that the waveform from the combined intervals corresponds to the continuous waveform over the total time.

In some embodiments, a light sensor arrangement samples light at overlapping time periods to facilitate the mitigation of flicker noise from ambient light sources supplied by either 50 Hz or 60 Hz power supplies to generate an output. Specifically, lights operating at 50 Hz or 60 Hz respectively exhibit oscillatory periods of about 20 ms and 16.67 ms. A 20 ms sample is taken at equally-offset intervals (relative to adjacent intervals) during a time interval of 33.3 ms. Each sample is generally free from flicker noise corresponding to 50 Hz light sources because it corresponds to one oscillatory period of the source (with five of such periods corresponding to a 100 ms sample window). The five samples are combined and used to generate an integrated (averaged) output that corresponds to a total sample time of 100 ms, which corresponds to a number of periods (6) for 60 Hz light sources and is thus generally free from flicker noise. The samples are also spaced such that the combined value of the light sampled during the intervals corresponds to a combined value of light sampled over the 100 ms total sample time (i.e., the waveform of the combined overlapping samples is about equal in value to the waveform over the total sample time). The output is used as an averaged representation of the detected light (e.g., averaged intensity) for a variety of purposes, such as for controlling the intensity of a display. The output is substantially flicker-free, such that the intensity of the display is controlled in a manner that is consistent relative to human perception (i.e., variation in the display due to ambient light flicker is mitigated).

According to another example embodiment of the present invention, a display device includes an ambient light sensor and control circuit for controlling characteristics such as the intensity of the display. For example, some applications detect conditions of ambient light to provide a desirable viewing experience while controlling power consumption. Light is detected using overlapping time segments corresponding to an oscillatory period for light sources powered by supplies operating at a first supply frequency, and the overlapping time segments are combined and used to generate an output that corresponds to an integer number of oscillatory periods for a second light source. These approaches may be implemented as described above and are applicable, for example, to the control of displays (e.g., LCD displays) in hand-held devices such as mobile phones, media (audio/video) players, cameras, and computing devices. These approaches are also applicable to larger devices, such as laptop computers, electronics control displays, displays in moving vehicles, or any display that is used in environments subject to varying ambient light conditions.

The time intervals as discussed above and otherwise herein are about equal to the indicated supply frequency-based oscillatory periods. In this context, the time intervals may be within a certain time of these periods with some degree of variation. For instance, in some embodiments, the intervals are about equal to the indicated oscillatory periods (or integer combination of periods) within a few percent. In other embodiments, the intervals vary up to about 10%, relative to the corresponding oscillatory periods. These approaches can be used to generate what is described as substantially flicker-free outputs that can be used, for example, in controlling the display of a hand-held device, relative to ambient light conditions.

Figure 1:
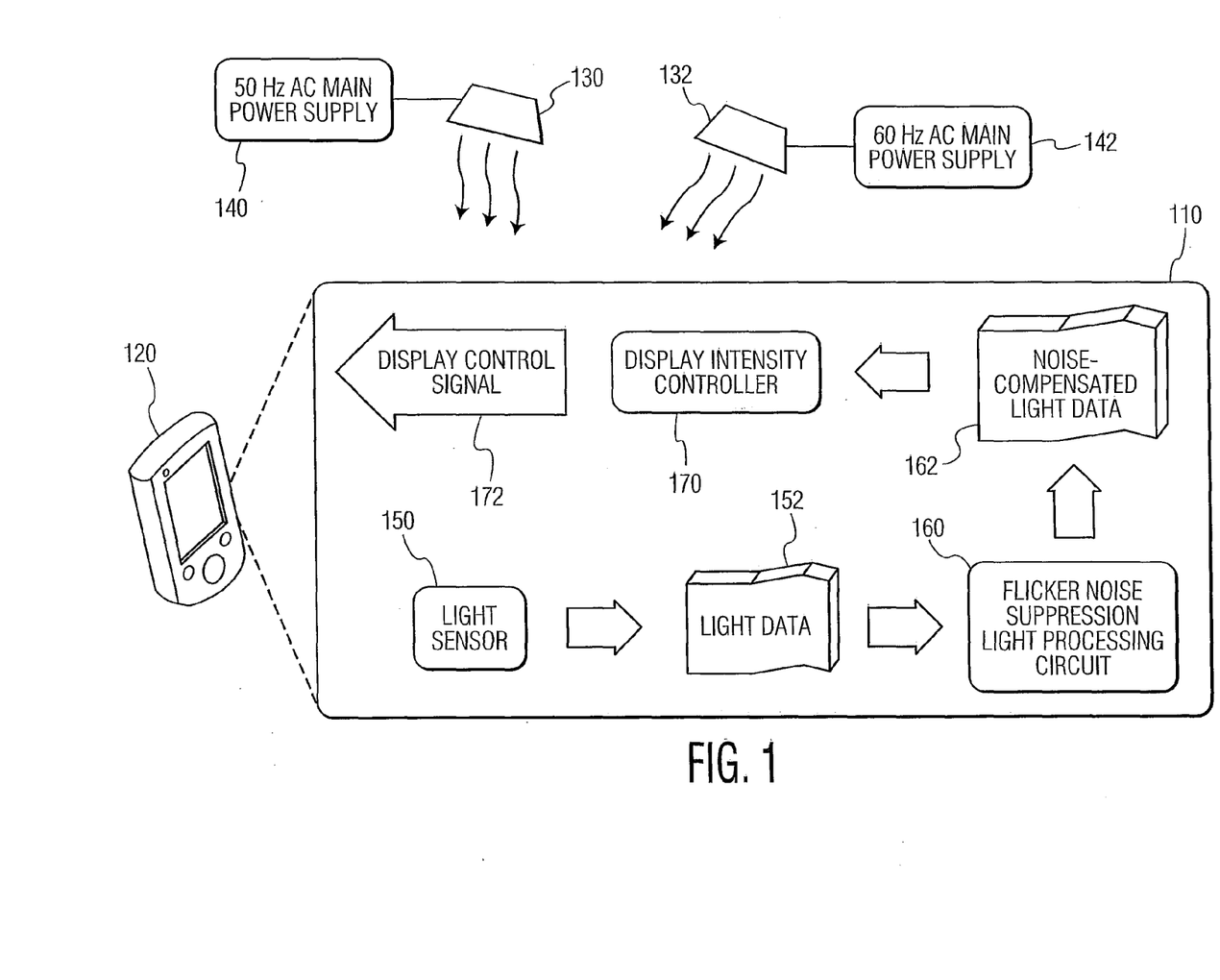
FIG. 1 shows a light sensor system with an example device implementation, according to an example embodiment of the present invention.

Turning now to the figures, FIG. 1 shows a light sensor system 110 implemented with a hand-held device 120, according to an example embodiment of the present invention. The sensor system 110 detects light characteristics from light sources that are operated at different AC power supply frequencies, as may be encountered in different ambient light environments. In this regard and by way of example, two light sources 130 and 132 are shown as respectively operated by a 50 Hz power supply 140 and a 60 Hz power supply 142. These light sources represent ambient light generation in different environments that the hand-held device 120 is expected to encounter, such as when a traveler brings her hand-held device with her in traveling from the United Kingdom to the United States, where power supplies are respectively operated at 50 Hz and 60 Hz.

The sensor system 110 includes a light sensor 150 that detects a condition of ambient light in the environment that the hand-held device 120 is operated in. In this context, the light sensor 150 may be located on or near a display on the hand-held device 120, and used for detecting the intensity of light incident upon the display. The sensor passes light data 152 to a light processing circuit 160 that uses the light data for flicker noise suppression. The light processing circuit 160 samples a portion of incoming light intensity data 152 that corresponds to an integer number of cycles of the power supply that supplies the light source generating the incident light in a manner similar to that described above and/or below in connection with other figures. The light processing circuit 160 uses the sampled portion of incoming light intensity data 152 to generate an average value of the intensity of the incoming light as noise-compensated light data 162.

The light processing circuit 160 sets the time period for sampling the light intensity data 152 to correspond to the oscillatory cycle of the 50 Hz power supply 140. A series of overlapping and equally-spaced samples are taken to generate a total number of samples that corresponds, from a time and value perspective, to an integer number of oscillatory cycles of the 60 Hz power supply 142. This approach is generally consistent with the approach described above and/or as described below and shown in FIG. 2A and in FIG. 2B. Of note, this approach may be applicable to use with a variety of different types of power supplies that respectively operate at different frequencies.

A display intensity controller 170 uses the noise-compensated light data 162 to provide a display control signal 172 for controlling the intensity of the display at the hand-held device 120. That is, in ambient light conditions exhibiting a relatively bright light intensity, the display is controlled to operate at a relatively high level of brightness. Under low-light conditions, the display is controlled to operate at a relatively lower level of brightness.

In some embodiments, the sensor system 110 operates independently from other circuits in the hand-held device 120, and provides the display control signal 172 as an external input that is processed by a display controller in the hand-held device. In other embodiments, the sensor system 110 is integrated with a circuit that is used to operate other aspects of the hand-held device 120. In still other embodiments, some aspects of the sensor system 110 are implemented separately, with and/or separate from other circuits in the hand-held device and, in some implementations, as software-implemented functions.

The light sensor system 110 can be used with a variety of different types of hand-held devices. In this context, hand-held device 120 may be implemented as a mobile phone, a music player, video player, PDA or other hand-held device using a display, such as an LCD display.

Figure 2A:
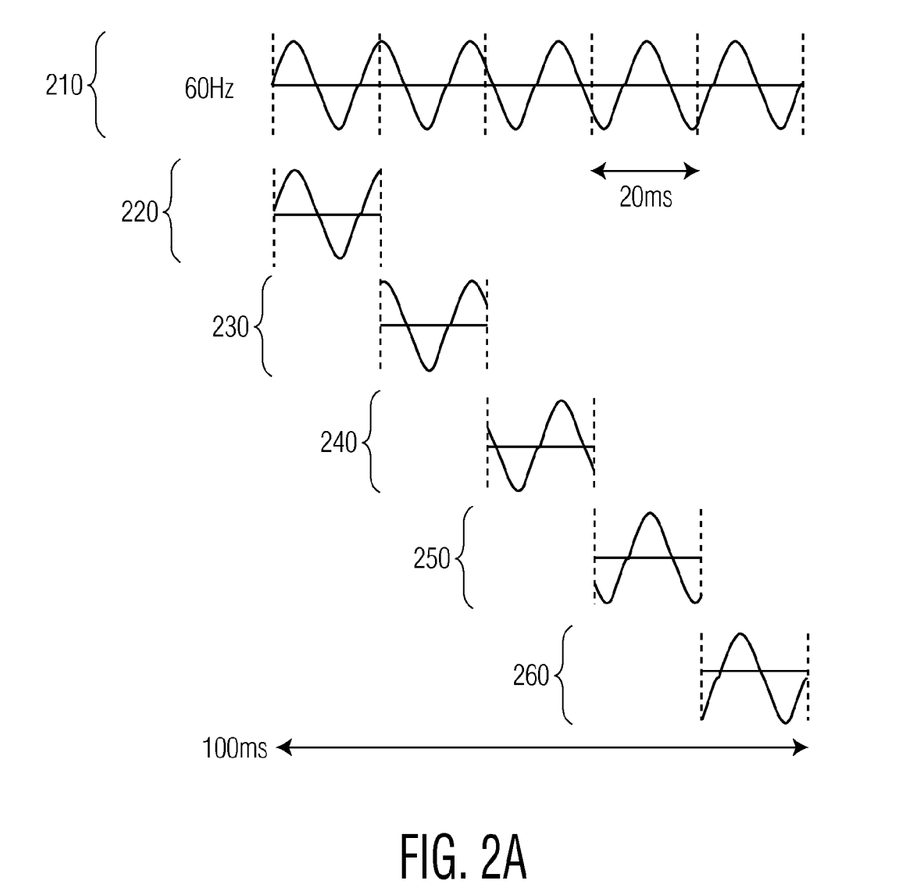
FIG. 2A shows a 100 ms sampling of an incoming signal as used in generating an averaged signal.
Figure 2B:
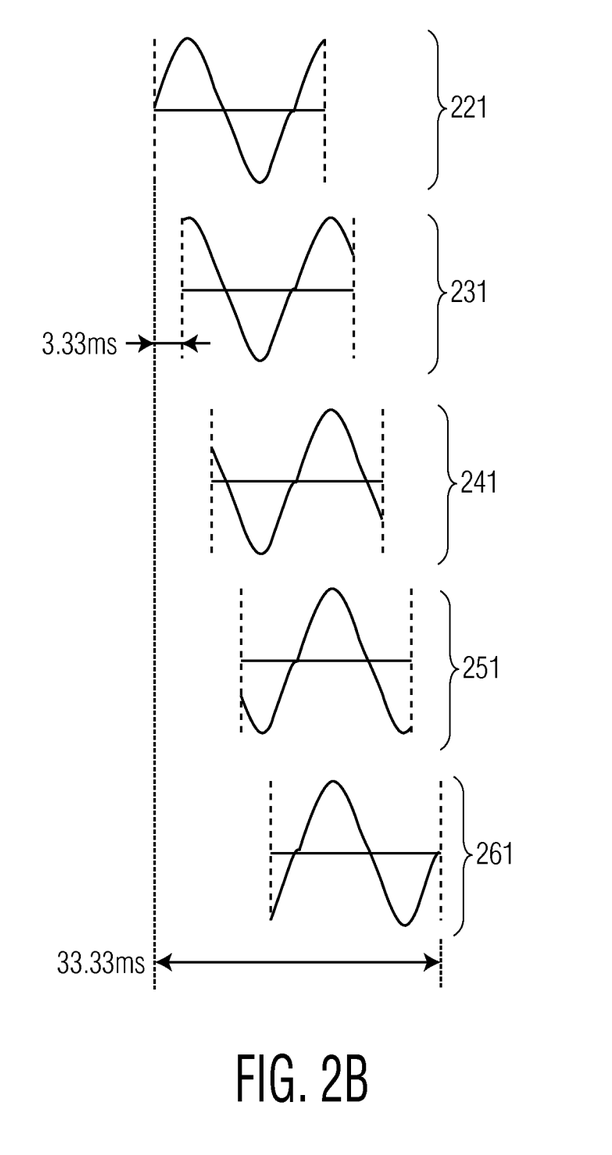
FIG. 2B shows equally-spaced samples of the incoming signal in FIG. 2A over a 33.3 ms time interval.
Figure 2C:
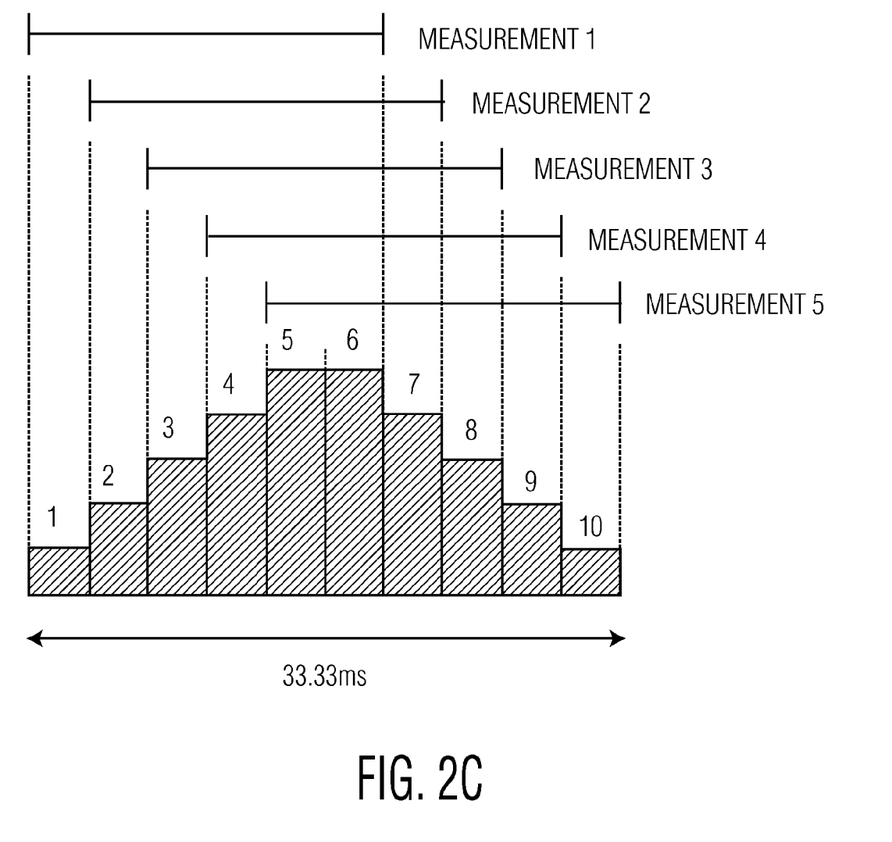
FIG. 2C shows a measurement approach for use with a 33.3 ms time interval as shown in FIG. 2B.

FIGS. 2A-2C show a sampling and averaging approach for light sensing, according to another example embodiment of the present invention. By way of example and for consistency with the above discussion in FIG. 1, the examples in FIG. 2A-2C correspond to operating conditions of 50 Hz and 60 Hz power supplies.

FIG. 2A shows a 100 ms sampling of an incoming 60 Hz signal 210, and FIG. 2B shows samples of the same incoming signal at equally-spaced intervals within a 33.3 ms time interval. The sampling in FIG. 2A shows five equal 20 ms samples 220-260 corresponding to consecutive portions of the incoming 60 Hz signal 210. The 20 ms time period for the samples corresponds to an oscillatory cycle of a 50 Hz signal (i.e., each oscillation is 20 ms), and as such each sample period, when taken under 50 Hz supply conditions, corresponds to a full oscillatory cycle of the incoming signal and thus are not susceptible to 50 Hz flicker.

Overlapping samples 221-261 in FIG. 2B correspond to the samples 220-260 in FIG. 2A (e.g., virtually represented in FIG. 2A), but are taken at equal spacing over a 33.3 ms time interval. That is, the five overlapping samples 221-261 of a 60 Hz signal 210 taken during a 33.3 ms time interval in FIG. 2B correspond effectively in both total time and in value to the five samples 220-260 of the same incoming signal, taken at consecutive time intervals. In this context, the samples 221-261 are taken over a 33.3 ms time period and used to determine an average signal (e.g., light intensity) that corresponds to a signal taken over 100 ms and at an integer number of oscillatory cycles (here, six cycles as corresponding to the incoming 60 Hz signal 210). In this regard, the effective waveform measured or detected at 20 ms intervals 221-261 corresponds directly to the 60 Hz waveform 210 over a 100 ms time interval, with the same effective total measurement time.

The measurement or detection of the overlapping signals as shown in FIG. 2B is carried out in one or more of a variety of manners. In some applications, the overlapping signals are separately sampled using an analog or digital approach. In other applications, the time interval of 33.3 ms is sampled, during which the results of individual segments within this interval are added to respectively provide an output that corresponds to the total 100 ms time interval in the signal 210.

FIG. 2C shows an example digital measurement approach for use with the 33.3 ms time interval shown in FIG. 2B, where portions of the 33.3 ms time interval are added to provide a total measurement that corresponds to a 100 ms time interval, according to another example embodiment of the present invention. The 33.3 ms time interval is broken up into ten 3.33 ms intervals, which corresponds to an equal offset of each of the five samples as shown in FIG. 2B. Referencing FIG. 2B and FIG. 2C together, a single 33.33 ms measurement is taken, with a varying sensitivity reflecting the overlap between these separate measurements. For instance, from 0 s to 3.33 ms a first measurement (1) is active, corresponding to a relative sensitivity of 1. From 3.33 ms to 6.66 ms, a second measurement (2) is also active, corresponding to a sensitivity of 2. Measurements 1 through measurement 5 are respectively active or inactive as shown, corresponding to respective sensitivities (1-5 as shown). The single 33.33 ms measurement is used in combination with a stair-case sensitivity curve to give a result corresponding to five separate measurements, such as shown in FIG. 2B.

An alternate characterization of the implementation of FIG. 2C involves using ten separate time intervals and counting the intervals to respectively correspond to the sensitivities discussed above. Referring again to both FIGS. 2B and 2C, the value of the outside (first and last) 3.33 ms intervals 1 and 10 are counted only once, as each corresponds to only one of the 20 ms intervals (221 and 261, respectively). The 3.33 ms intervals 2 and 9 are counted twice, as each corresponds to two of the 20 ms intervals (221+231 for interval 2, and 251+261 for interval 9). The 3.33 ms intervals 3 and 8 are counted three times, respectively for intervals 221+231+241, and intervals 241+251+261. Intervals 4 and 7 are counted four times, respectively for intervals 221+231+241+251, and intervals 231+241+251+261. Intervals 5 and 6 are counted five times for all of the intervals 221-261, as each interval overlaps time intervals 5 and 6.

The approach shown in FIG. 2C is carried out in one or more of a variety of manners. In one example embodiment, a digital processing circuit is used, with an analog-to-digital converter (ADC) that converts an incoming signal (e.g., 210) to an oscillating signal (i.e., frequency). A counter counts the number of oscillations for a given time and generates a digital output corresponding to the same. The counter is increased in value by 1,2,3,4 or 5 depending on the time, so that each time interval is counted one, two, three, four or five times. This approach provides an output, as discussed above, corresponding to a total value that is the same as the signal over a 100 ms time period but taken over five equally-spaced overlapping intervals during a 33.3 ms interval.

Figure 3:
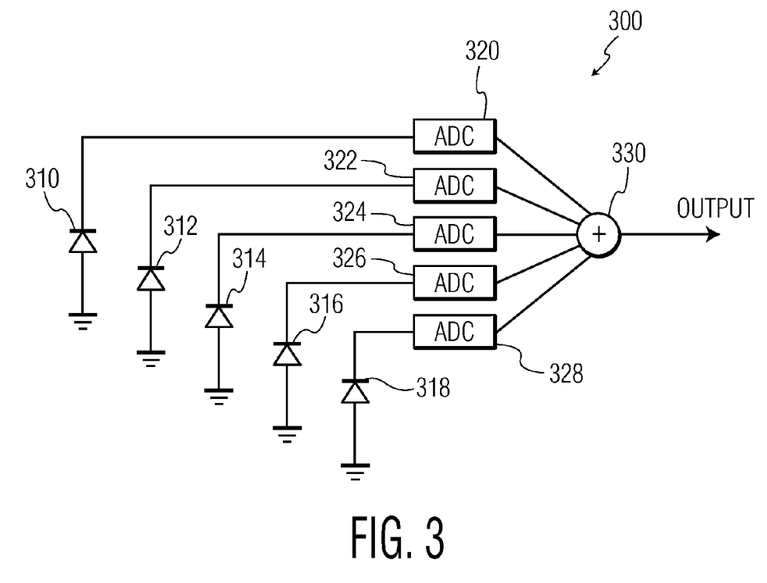
FIG. 3 shows a system for noise suppression in an image sensor, according to another example embodiment of the present invention.

FIG. 3 shows a system 300 for noise suppression in an image sensor, according to another example embodiment of the present invention. The system 300 includes photodiodes 310-318 (e.g., five pixels) that respectively sample equally-spaced portions of incoming light over a particular time interval, such as the analog portions 221-261 of the 33.3 ms time interval shown in FIG. 2B. That is, each photodiode 310-318 is operated during overlapping time intervals as shown in FIG. 2B.

The outputs of the photodiodes 310-318 are respectively passed to analog-to-digital converters (ADCs) 320-328, which convert the analog signals to digital signals. The ADCs 320-328 output their respective digital signals to an adder circuit 330, which adds the digital signals and provides an output for use in determining an averaged value of light detected by the photodiodes 310-318.

Figure 4:
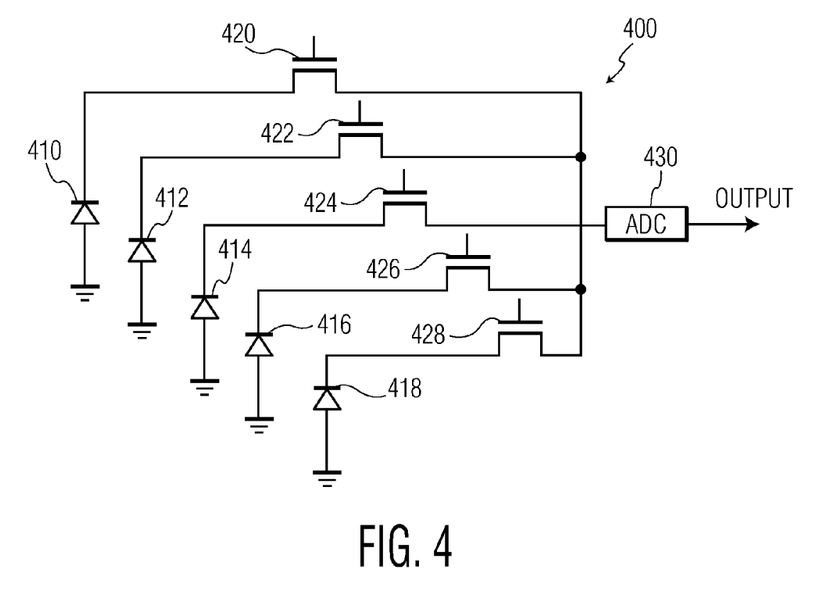
FIG. 4 shows a system for noise suppression in an image sensor, according to another example embodiment of the present invention.

FIG. 4 shows a system 400 for noise suppression in an image sensor, according to another example embodiment of the present invention. The system 400 includes photodiodes 410-418 (e.g., five pixels) that respectively sample equally-spaced portions of incoming light over a particular time interval, such as the analog portions 221-261 of the 33.3 ms time interval shown in FIG. 2B. The analog output of the photodiodes 410-418 is passed respectively to transistors 420-428, which are selectively operated to provide an output to an ADC 430 (e.g., in accordance with the sensitivity shown in FIG. 2B). The ADC 430 provides an output for use in determining an averaged value of light detected by the photodiodes 410-418.

Figure 5:
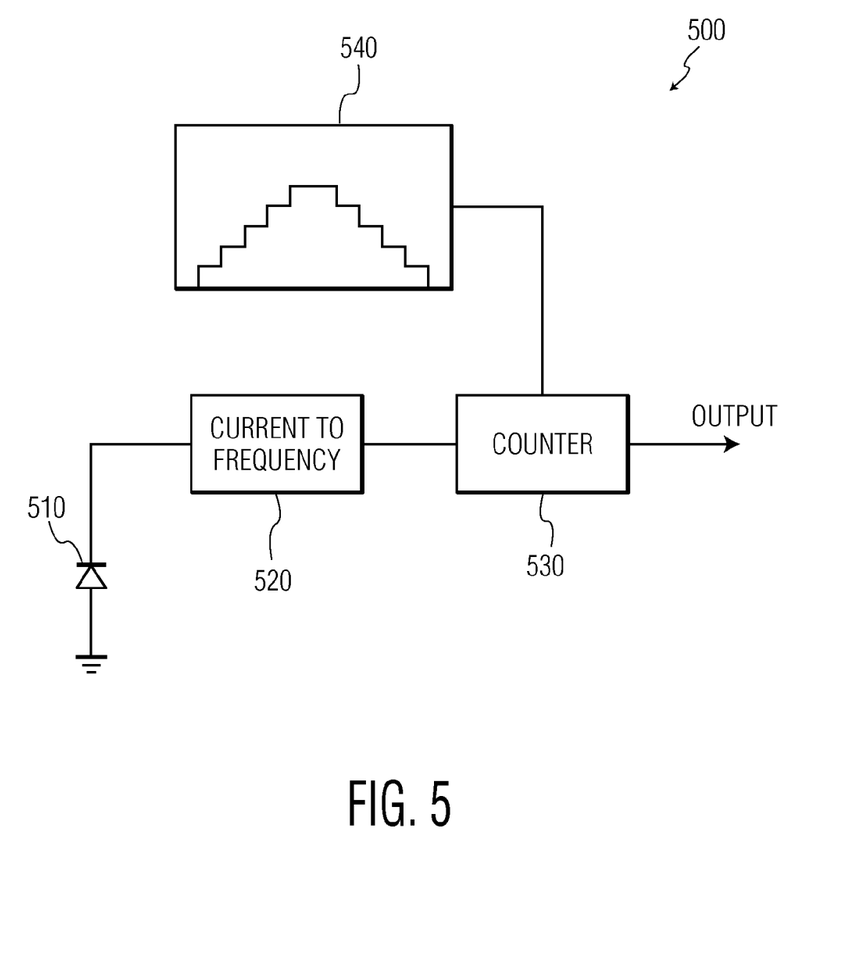
FIG. 5 shows a system for noise suppression in an image sensor, according to another example embodiment of the present invention.

FIG. 5 shows a system 500 for noise suppression in an image sensor, according to another example embodiment of the present invention. A single photodiode (e.g., single pixel) is operated over an entire sampling period, with the output fed to a current to frequency converter 520, which in turn outputs the converted current to a counter 530. The counter 530 counts the received output in accordance with a stair-case sensitivity curve 540 (e.g., corresponding to the measurements shown in FIG. 2B).

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true scope of the present invention.

What is claimed is:

1. A sensor arrangement for use in sensing light from either a light source that is respectively operation at a first power supply frequency or a light source that is operated at a second power supply frequency which is different from said first power supply frequency, the sensor arrangement comprising:
   a light detector configured to generate an output in response to light incident upon the detector; and
   an averaging circuit configured to
   sample the output during each of a plurality of overlapping and equally spaced time intervals, each interval being about equal in time to an oscillatory period of the first power supply frequency and the combined time of the intervals being about equal to the combined time of an integer number of oscillatory periods of the second power supply frequency, and
   to integrate the output sampled for each of the overlapping time intervals and to combine the integrated output to form a new output;
   wherein the light detector is a photo-element,
   the averaging circuit is a digital averaging circuit that samples a continuous output of the photo-element over a time interval including all of the overlapping intervals, and
   the digital averaging circuit integrates the output sampled for each of the overlapping time intervals and combines the integrated output to form the new output by weighting portions of the output according to the number of time intervals that overlap in each portion, and combining weighted portions of the output to form the new output.

2. The sensor arrangement of claim 1, wherein the new output is an average value of the output of the light detector.

3. The sensor arrangement of claim 1, wherein
   the light detector includes a separate light sensor for each of the overlapping time intervals, and
   the averaging circuit samples the output during each of a number of overlapping time intervals using, for each overlapping interval, the output of the light sensor for that interval.

4. The sensor arrangement of claim 1, wherein
   the light detector includes, for each of the overlapping time intervals, a separate light sensor and transistor, the transistor selectively connecting the output of the light sensor during the time interval, and
   the averaging circuit samples the output during each of a number of overlapping time intervals using, for each overlapping interval, the output of the light sensor for that interval as connected by the transistor.

5. The sensor arrangement of claim 1, wherein
   the light detector includes a separate light sensor for each of the overlapping time intervals, each light sensor being operated in an on condition during its overlapping time interval and operated in an off condition otherwise, and
   the averaging circuit samples the output during each of a number of overlapping time intervals using, for each overlapping interval, the output of the light sensor for that interval.

6. A method for sensing light from light sources that are respectively operated at different power supply frequencies, the method comprising:
   generating an output in response to incident light;
   sampling the output during each of a plurality of overlapping and equally spaced time intervals, each interval being about equal in time to an oscillatory period of the first power supply frequency and the combined time of the intervals being about equal to the combined time of an integer number of oscillatory periods of the second power supply frequency; and
   integrating the output sampled for each of the overlapping time intervals and combining the integrated output to form a new output that characterizes the incident light;
   wherein generating an output includes using a single photo-element to generate a digital output,
   sampling the output includes sampling a continuous output of the photo-element over a time interval including all of the overlapping intervals, and integrating the output and combining the integrated output includes
   weighting portions of the output according to the number of time intervals that overlap in each portion, and
   combining weighted portions of the output to form the new output.

7. The method of claim 6, wherein integrating the output sampled for each of the overlapping time intervals and combining the integrated output to form a new output that characterizes the incident light includes providing a new output that is substantially free of flicker for incident light generated using either of the power supply frequencies.

8. The method of claim 6, wherein integrating the output sampled for each of the overlapping time intervals and combining the integrated output to form a new output that characterizes the incident light includes generating a new output that is an average value of the output of the light detector.

9. The method of claim 6, wherein combining the integrated output to form a new output includes forming a new output having a value that is directly proportional to the average value of the generated output over a continuous time period that is about equal to said combined time.

10. The method of claim 6, wherein combining the integrated output to form a new output includes forming a new output that is about equal to the value of the generated output over a continuous time period that is about equal to said combined time.

11. A hand-held mobile device for operation in different ambient conditions involving light sources that are respectively operated at different power supply frequencies, the device comprising:

a sensor arrangement for use in sensing light from either a light source that is respectively operation at a first power supply frequency or a light source that is operated at a second power supply frequency which is different from said first power supply frequency, the sensor arrangement including, a light detector configured to generate an output in response to light incident upon the detector; and an averaging circuit configured to sample the output during each of a plurality of overlapping and equally spaced time intervals, each interval being about equal in time to an oscillatory period of the first power supply, frequency, and the combined time of the intervals being about equal to the combined time of an integer number of oscillatory periods of the second power supply frequency, and to integrate the output sampled for each of the overlapping time intervals and to combine the integrated output to form a new a display screen for displaying images; and a display control circuit to control the operation of the display screen in response to the new output;

wherein the light detector is a single photo-element, the averaging circuit is a digital averaging circuit that samples a continuous output of the photo-element over a time interval including all of the overlapping intervals, and the digital averaging circuit integrates the output sampled for each of the overlapping time intervals and combines the integrated output to form a new output that characterizes the incident light by weighting portions of the output according to the number of time intervals that overlap in each portion, and combining weighted portions of the output to form the new output.

12. The device of claim 11, wherein the averaging circuit integrates the output sampled for each of the overlapping time intervals and combines the integrated output to form a new output that characterizes the incident light by providing a new output that is substantially free of flicker for incident light generated using either of the power supply frequencies.

13. The device of claim 11, wherein the averaging circuit combines the integrated output to generate a new output that is directly proportional to the average value of the output of the light detector over a continuous time period that is about equal to said combined time.

* * * * *